United States Patent
Nishioka et al.

(10) Patent No.: US 9,677,442 B2
(45) Date of Patent: Jun. 13, 2017

(54) SULFUR CONCENTRATION DETERMINATION SYSTEM FOR AN INTERNAL COMBUSTION ENGINE

(71) Applicant: TOYOTA JIDOSHA KABUSHIKI KAISHA, Toyota-shi, Aichi-ken (JP)

(72) Inventors: Hiromasa Nishioka, Susono (JP); Daichi Imai, Shizuoka-ken (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 64 days.

(21) Appl. No.: 14/883,933

(22) Filed: Oct. 15, 2015

(65) Prior Publication Data

US 2016/0108844 A1  Apr. 21, 2016

(30) Foreign Application Priority Data

Oct. 17, 2014  (JP) ................................. 2014-212811

(51) Int. Cl.
| | |
|---|---|
| F01N 3/00 | (2006.01) |
| F01N 3/20 | (2006.01) |
| F02D 19/06 | (2006.01) |
| F02D 41/00 | (2006.01) |
| F01N 3/10 | (2006.01) |

(Continued)

(52) U.S. Cl.
CPC .......... *F01N 3/2066* (2013.01); *F01N 3/103* (2013.01); *F01N 9/00* (2013.01); *F02D 19/0636* (2013.01); *F02D 41/0025* (2013.01); *F01N 2260/04* (2013.01); *F02D 41/027* (2013.01); *F02D 2200/0612* (2013.01);

(Continued)

(58) Field of Classification Search
CPC .... F02D 41/30; F02D 41/0025; F02D 41/027; F02D 19/0636; F02D 2200/0612; F02D 2200/0802; F01N 3/2066; F01N 3/103; F01N 9/00; F01N 2260/04; Y02T 10/47; Y02T 10/36
USPC .......................... 60/285, 286, 299, 300, 301
See application file for complete search history.

(56) References Cited

U.S. PATENT DOCUMENTS

2011/0271659 A1  11/2011  Umemoto et al.

FOREIGN PATENT DOCUMENTS

| JP | 2010-185448 A | 8/2010 |
|---|---|---|
| JP | 2013-227887 A | 11/2013 |

*Primary Examiner* — Phutthiwat Wongwian
*Assistant Examiner* — Kelsey Stanek
(74) *Attorney, Agent, or Firm* — Andrews Kurth Kenyon LLP

(57) ABSTRACT

A concentration of sulfur components contained in fuel is determined, without adding any special sensor for determining the sulfur concentration of the fuel. To this end, a sulfur concentration determination system for an internal combustion engine is provided with an exhaust gas purification device including an oxidation catalyst disposed in an exhaust passage, and a supply device for supplying fuel to exhaust gas flowing into the exhaust gas purification device, wherein after the end of poisoning elimination processing of the oxidation catalyst, fuel supply processing is carried out in which the fuel is supplied to the exhaust gas purification device in such a manner that an amount of fuel supplied to the exhaust gas purification device per unit time becomes constant, and the concentration of sulfur components contained in the fuel is determined by using as a parameter a period of time (an oxidation reaction period of time) required from a starting point in time of the fuel supply processing until the temperature of the oxidation catalyst drops to an initial temperature or below.

12 Claims, 8 Drawing Sheets

(51) Int. Cl.
 *F01N 9/00*   (2006.01)
 *F02D 41/02*   (2006.01)
(52) U.S. Cl.
 CPC ....... *F02D 2200/0802* (2013.01); *Y02T 10/36* (2013.01); *Y02T 10/47* (2013.01)

SULFUR CONCENTRATION DETERMINATION SYSTEM FOR AN INTERNAL COMBUSTION ENGINE

BACKGROUND OF THE INVENTION

Field of the Invention

The present invention relates to a technology of determining the concentration of sulfur components contained in fuel in an internal combustion engine.

Description of the Related Art

As a method for detecting the concentration of sulfur components contained in fuel in an internal combustion engine, there has been proposed one in which an SOx sensor for detecting an amount of sulfur compounds (SOx) contained in exhaust gas is disposed in an exhaust passage at a location downstream of an exhaust gas purification device, so that the concentration of sulfur components contained in the fuel is detected based on a measured value of the SOx sensor at the time of raising the temperature of the exhaust gas purification device to a temperature range in which SOx desorbs from the exhaust gas purification device (see, for example, a first patent literature).

In addition, as the method for detecting sulfur components contained in fuel in an internal combustion engine, there has also been proposed another one in which a catalytic material or an adsorbing material, of which the oxidizing ability is decreased due to sulfur poisoning, is coated to an exhaust gas temperature sensor, and sulfur components in fuel are detected based on a measured value of the exhaust gas temperature sensor (see, for example, a second patent literature).

CITATION LIST

Patent Literature

[First Patent Literature] Japanese patent laid-open publication No. 2013-227887

[Second Patent Literature] Japanese patent laid-open publication No. 2010-185448

SUMMARY OF THE INVENTION

However, the above-mentioned conventional technologies have the following problem. That is, it is necessary to dispose a special sensor such as the exhaust gas temperature sensor coated with the catalytic material or the absorbing material, the SOx sensor, etc., in the exhaust passage of the internal combustion engine, thus causing an increase in the number of component parts as well as an increase in cost.

The present invention has been made in view of the various circumstances as referred to above, and the object of the invention is to provide a technology in which a concentration of sulfur components contained in fuel can be determined, without adding any special sensor for detecting the concentration of sulfur components contained in the fuel.

In order to solve the above-mentioned problem, the present invention resides in a sulfur concentration determination system for an internal combustion engine which is provided with an exhaust gas purification device including an oxidation catalyst and a supply device for supplying fuel to the exhaust gas purification device, wherein after sulfur poisoning of the oxidation catalyst has been eliminated, fuel is supplied to the exhaust gas purification device, whereby the concentration of sulfur components contained in the fuel is determined based on a temperature change in the oxidation catalyst at the time of the fuel being supplied.

Specifically, the present invention resides in a sulfur concentration determination system for an internal combustion engine which is provided with an exhaust gas purification device that is disposed in an exhaust passage and includes an oxidation catalyst, and a supply device that supplies fuel to an exhaust gas flowing into the exhaust gas purification device, the sulfur concentration determination system comprising: a controller comprising at least one processor configured to: carry out poisoning elimination processing which is to eliminate sulfur poisoning of the oxidation catalyst by raising the temperature of the oxidation catalyst; carry out fuel supply processing which is to supply fuel from the supply device to the exhaust gas purification device so as to make an amount of fuel supplied to the exhaust gas purification device per unit time constant, when the temperature of the oxidation catalyst is equal to or higher than a predetermined reference temperature which is equal to or higher than an activation temperature, after the end of the poisoning elimination processing; measure a physical quantity which is correlated with a period of time required from a starting point in time of the fuel supply processing until the temperature of the oxidation catalyst drops to a predetermined temperature or below which is equal to or higher than a temperature at the starting point in time of the fuel supply processing, under the condition that the fuel supply processing is continuously carried out, the physical quantity becoming larger as the period of time becomes longer; and make a determination that the concentration of sulfur components contained in the fuel is higher when the physical quantity is small, in comparison with when it is large.

When the fuel supply processing is continuously carried out in a state where the oxidizing ability of the oxidation catalyst has been activated after the end of the poisoning elimination processing, the temperature of the oxidation catalyst goes up once, and then drops. Specifically, at the beginning when the fuel supply processing has been started, fuel supplied from the supply device (hereinafter, being referred to as "supplied fuel") is oxidized by the oxidation catalyst to generate heat, so that the temperature of the oxidation catalyst is caused to rise by means of the heat of reaction thus generated. After that, as the sulfur components contained in the supplied fuel adhere to or deposit on the oxidation catalyst, the sulfur poisoning of the oxidation catalyst progresses, so the amount of supplied fuel oxidized by the oxidation catalyst decreases. Then, when most of the oxidation catalyst is covered with the sulfur components, the oxidation catalyst falls into a state (deactivated state) unable to oxidize the most of the supplied fuel, so the reaction heat ceases to be generated. As a result, the temperature of the oxidation catalyst drops.

Here, the poisoning elimination processing is carried out in a predetermined period of time in such a manner that the amount of sulfur components adhered to or deposited on the oxidation catalyst (hereinafter, referred to as the "amount of sulfur poisoning") becomes a substantially constant amount which is approximate to zero. In addition, the amount of sulfur components to adhere to or deposit on the oxidation catalyst per unit time under the situation in which the fuel supply processing is continuously carried out becomes higher in the case where the concentration of sulfur components (hereinafter, referred to as the "sulfur concentration") contained in the supplied fuel is high than in the case where it is low.

Accordingly, as mentioned above, in the case where the fuel supply processing is continuously carried out after the end of the poisoning elimination processing, a period of time taken from the starting point in time of the fuel supply processing until the time when the oxidation catalyst is deactivated becomes shorter when the sulfur concentration of the supplied fuel is high than when it is low. This results in that the period of time (hereinafter, referred to as an "oxidation reaction period of time") required for the temperature of the oxidation catalyst to drop to the predetermined temperature or below from the starting point in time of the fuel supply processing also becomes shorter, in the case where the sulfur concentration of the supplied fuel is high than in the case where it is low. Here, note that the "predetermined temperature" referred to herein may also be a temperature at which it can be considered that the oxidation catalyst is deactivated by sulfur poisoning, when the temperature of the oxidation catalyst becomes equal to or less than the predetermined temperature.

I view of the correlation between the oxidation reaction period of time and the sulfur concentration of the supplied fuel as referred to above, the sulfur concentration of the fuel can be determined by using, as a parameter, a physical quantity which becomes larger as the oxidation reaction period of time becomes longer. For example, a determination can be made that in the case where the physical quantity is small (the oxidation reaction period of time is short), the sulfur concentration of the fuel is higher, in comparison with the case where it is large (the oxidation reaction period of time is long). In addition, in the case where the physical quantity is smaller than a predetermined determination value, a determination can also be made that sulfur is contained in the fuel, whereas in the case where the physical quantity is more than the predetermined determination value, a determination can also be made that sulfur is not contained in the fuel. Accordingly, it becomes possible to determine the sulfur concentration of the fuel, without using a special sensor such as a SOx sensor, etc.

Here, the physical quantity correlated with the oxidation reaction period of time may be a period of time required for the temperature of the oxidation catalyst to drop to the predetermined temperature or below from the starting point in time of the fuel supply processing, or may be an integrated value of the supplied fuel required for the temperature of the oxidation catalyst to drop to the predetermined temperature below from the starting point in time of the fuel supply processing. Here, note that as the physical quantity correlated with the oxidation reaction period of time, there may be used a gradient (a rate of temperature rise) at the time when the temperature of the oxidation catalyst drops after having once risen up. When the temperature of the oxidation catalyst drops after having once risen up, the rate of temperature rise becomes a negative value, and the magnitude thereof becomes larger as the oxidation reaction period of time becomes longer, so the sulfur concentration of the fuel can also be determined based on the rate of temperature rise.

In the present invention, the exhaust gas purification device may be further provided with a heating device that heats the oxidation catalyst. In that case, the controller may carry out the poisoning elimination processing by heating the oxidation catalyst by means of the heating device. The "heating device" referred to herein is a device which heats the oxidation catalyst without being accompanied by the supply of fuel to the exhaust gas purification device, and is, for example, a heater of electric type which heats the oxidation catalyst by converting electrical energy into heat energy.

Here, when fuel is supplied from the supply device to the exhaust gas purification device, the fuel is oxidized by the oxidation catalyst to generate oxidation heat, and the temperature of the oxidation catalyst is caused to rise due to the reaction heat. Accordingly, when the temperature of the oxidation catalyst is caused to rise to a temperature at which the sulfur components desorb from the oxidation catalyst by supplying fuel from the supply device to the exhaust gas purification device, the sulfur components adhered to or deposited on the oxidation catalyst can be desorbed. However, if the poisoning elimination processing is carried out by a method of supplying fuel from the supply device to the exhaust gas purification device, the oxidation catalyst will be poisoned to not a little extent by the sulfur components contained in the supplied fuel, so that some of the sulfur components may remain in the oxidation catalyst at the end of the poisoning elimination processing, and a residual amount of the sulfur components in that case may not be stabilized to a fixed amount. When the fuel supply processing is carried out in such a state, the correlation between the sulfur concentration of the fuel and the oxidation reaction period of time may become low.

On the other hand, when the poisoning elimination processing is carried out by the method of heating the oxidation catalyst by means of the heating device, almost all of the sulfur components having adhered to or deposited on the oxidation catalyst can be desorbed. As a result, the fuel supply processing can be started in a state where almost all the sulfur components have desorbed from the oxidation catalyst, the correlation between the sulfur concentration of the supplied fuel and the oxidation reaction period of time becomes high. Accordingly, it becomes possible to determine the sulfur concentration of the fuel in a more accurate manner by using as a parameter the physical quantity correlated with the oxidation reaction period of time.

Here, note that in the arrangement in which the exhaust gas purification device is provided with the heating device, the controller may carry out the poisoning elimination processing according to either one of a first temperature rise mode in which the temperature of the oxidation catalyst is raised by supplying fuel from the supply device to the exhaust gas purification device, and a second temperature raising mode in which the temperature of the oxidation catalyst is raised by heating the oxidation catalyst by means of the heating device. However, it is desirable for the controller to carry out the poisoning elimination processing according to the second temperature raising mode before the execution of the fuel supply processing. When the poisoning elimination processing is carried out according to the second temperature raising mode before the execution of the fuel supply processing, it is possible to increase the correlation between the physical quantity correlated with the oxidation reaction period of time and the sulfur concentration of the fuel, thus making it possible to determine the sulfur concentration of the fuel in a more accurate manner.

The sulfur concentration determination system according to the present invention may be further comprising that the controller carries out preheating processing which is to raise the temperature of the oxidation catalyst to the reference temperature or above by means of the heating device, in cases where the temperature of the oxidation catalyst has dropped to less than the reference temperature, after the end of the poisoning elimination processing and before the start of the fuel supply processing. In that case, the controller may start the fuel supply processing, when the temperature of the oxidation catalyst has been caused to rise to the reference temperature or above by carrying out the preheating processing.

In cases where a fuel cut-off operation of the internal combustion engine is carried out after the end of the poisoning elimination processing, there will be a possibility that the oxidation catalyst is cooled by exhaust gas of low temperature, whereby the oxidation reaction period of time may deviate from a period of time corresponding to an actual sulfur concentration. For that reason, the fuel supply processing can not be started immediately after the end of the poisoning elimination processing, so that the temperature of the oxidation catalyst may become lower than the reference temperature. In such a case, when the heating device carries out the preheating processing without accompanying the supply of fuel to the exhaust gas purification device, the temperature of the oxidation catalyst can be raised to the reference temperature or above, without advancing the poisoning of the oxidation catalyst. As a result, it is possible to determine the sulfur concentration of the fuel in an accurate manner.

Here, note that when a large amount of SOx is discharged from the internal combustion engine in the execution period of time of the preheating processing, the sulfur poisoning of the oxidation catalyst may progress due to the SOx thus discharged. Accordingly, when the amount of sulfur poisoning of the oxidation catalyst in the execution period of time of the preheating processing is equal to or more than the predetermined amount, the fuel supply processing may not be carried out. Here, the amount of the sulfur components to adhere or deposit on the oxidation catalyst in the execution period of time of the preheating processing is correlated with an integrated value of the amount of fuel injection in the period of time. Accordingly, when the integrated value of the amount of fuel injection in the period of time is equal to or more than the predetermined amount, the fuel supply processing may not be carried out. The "predetermined amount" referred to herein is an amount in which it is considered to be unable to determine the sulfur concentration of the fuel in an accurate manner, when the amount of sulfur poisoning of the oxidation catalyst becomes equal to or more than the predetermined amount. In addition, the expression "the fuel supply processing may not be carried out" referred to herein includes a mode in which the execution of the fuel supply processing is carried over until the end time point of the next poisoning elimination processing, a mode in which the fuel supply processing is carried out after the poisoning elimination processing is carried out again, etc.

In the present invention, the controller may end the fuel supply processing, when the temperature of the oxidation catalyst has dropped to the predetermined temperature or below. Then, the controller may carry out the poisoning elimination processing again, when the fuel supply processing has ended.

At the time when the temperature of the oxidation catalyst drops to the predetermined temperature or below, the oxidation catalyst will be in a deactivated state, and hence, if the fuel supply processing continues to be carried out even after the temperature of the oxidation catalyst has dropped to the predetermined temperature or below, the amount of unburnt fuel to be discharged into the atmosphere may become large. On the other hand, if the fuel supply processing is ended at the time when the temperature of the oxidation catalyst has dropped to equal to or less than the predetermined temperature, an increase in the unburnt fuel to be discharged into the atmosphere can be suppressed small. Further, if the poisoning elimination processing is carried out again when the temperature of the oxidation catalyst has dropped to equal to or less than the predetermined temperature, the purification performance of the oxidation catalyst can be regenerated, so it becomes possible to suppress the deterioration of exhaust emissions after the end of the fuel supply processing.

Here, note that in cases where the sulfur concentration of the fuel is low, the period of time required from the starting point in time of the fuel supply processing until the oxidation catalyst is deactivated may become long, and the amount of fuel required by the fuel supply processing may accordingly increase. In addition, in cases where sulfur components are not contained in the fuel, the oxidation catalyst may not be deactivated, as long as the fuel supply processing is continued. Accordingly, the sulfur concentration determination system for an internal combustion engine according to the present invention may be further comprising that the controller stops the fuel supply processing at the point in time when a predetermined period of time has elapsed, in the case where the temperature of the oxidation catalyst does not drop to the predetermined temperature or below within the predetermined period of time from the starting point in time of the fuel supply processing. In that case, the controller may be configured to determine the concentration of sulfur components contained in the fuel, by using, as the physical quantity correlated with the oxidation reaction period of time, the temperature of the oxidation catalyst at the point in time at which the predetermined period of time has elapsed. That is, the controller may be configured to determine that when the temperature of the oxidation catalyst at the point in time of the elapse of the predetermined period of time is low, the concentration of sulfur contained in the fuel is higher, in comparison with when it is high. At that time, the controller may be configured to determine that the lower the temperature of the oxidation catalyst at the point in time of the elapse of the predetermined period of time, the higher is the sulfur concentration of the fuel. Moreover, the controller may be configured to determine as follows: namely, in the case where the temperature of the oxidation catalyst at the point in time of the elapse of the predetermined period of time is lower than a predetermined determination temperature, sulfur is contained in the fuel, whereas in the case where the temperature of the oxidation catalyst at the point in time of the elapse of the predetermined period of time is equal to or higher than the predetermined determination temperature, sulfur is not contained in the fuel. According to such configurations, in the case where the sulfur concentration of the fuel is low, or in the case where sulfur is not contained in the fuel, the sulfur concentration of the fuel can be determined, without unnecessarily increasing the amount of fuel required for the fuel supply processing.

In addition, the exhaust gas purification device of the present invention may also include only an oxidation catalyst, or may also be a catalyst having oxidizing ability (e.g., a three-way catalyst, a storage reduction catalyst, or the like).

According to the present invention, it is possible to determine a concentration of sulfur components contained in fuel, without adding any special sensor for detecting the concentration of sulfur components contained in the fuel.

Further features of the present invention will become apparent from the following description of exemplary embodiments with reference to the attached drawings.

DESCRIPTION OF THE EMBODIMENTS

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment 1

Figure 1:
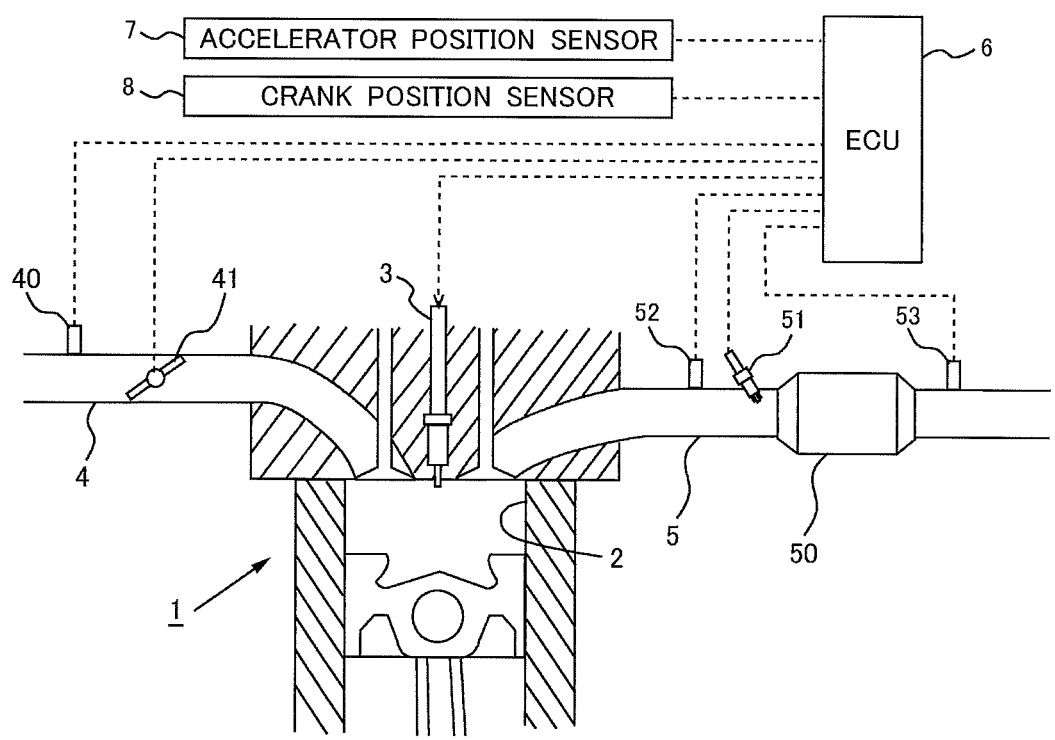
FIG. 1 is a view showing the schematic construction of an internal combustion engine to which the present invention is applied, in a first embodiment.

First, reference will be made to a first embodiment of the present invention based on FIGS. 1 through 4. FIG. 1 is a view showing the schematic construction of an internal combustion engine to which the present invention is applied. The internal combustion engine 1 shown in FIG. 1 is an internal combustion engine of compression ignition type (diesel engine) using light oil as fuel. Here, note that the internal combustion engine 1 may also be an internal combustion engine of spark ignition type using gasoline as fuel.

The internal combustion engine 1 is provided with a fuel injection valve 3 for injecting fuel into a cylinder 2. In cases where the internal combustion engine 1 is an internal combustion engine of spark ignition type, the fuel injection valve 3 may be constructed such that fuel is injected to an intake port.

The internal combustion engine 1 is connected to an intake pipe 4. In the middle of the intake pipe 4, there is arranged an air flow meter 40 that outputs an electrical signal corresponding to the amount (mass) of intake air (simply, air) flowing through the intake pipe 4. In the intake pipe 4 at the downstream side of the air flow meter 40, there is arranged an intake throttle valve 41 for adjusting the amount of intake air in the internal combustion engine 1 by changing the channel cross section of the intake pipe 4.

The internal combustion engine 1 is also connected to an exhaust pipe 5. A catalyst casing 50 is arranged in the middle of the exhaust pipe 5. The catalyst casing 50 receives a carrier carrying or supporting an oxidation catalyst in a cylindrical casing. The oxidation catalyst is a precious metal catalyst such as, for example, platinum (Pt) or palladium (Pd). The catalyst casing 50 constructed in this manner corresponds to an "exhaust gas purification device" according to the present invention.

A fuel addition valve 51, which adds fuel into the exhaust gas flowing through the interior of the exhaust pipe 5, and a first temperature sensor 52, which outputs an electrical signal correlated with the temperature of the exhaust gas flowing through the interior of the exhaust pipe 5, are mounted on the exhaust pipe 5 at locations upstream of the catalyst casing 50. On the exhaust pipe 5 at a location downstream of the catalyst casing 50, there is arranged a second temperature sensor 53 that outputs an electrical signal correlated with the temperature of the exhaust gas flowing through the interior of the exhaust pipe 5.

In the internal combustion engine 1, there is arranged in combination therewith an ECU (Electronic Control Unit) 6 for controlling the internal combustion engine 1. The ECU 6 is an electronic control unit which is composed of a CPU, a ROM, a RAM, a backup RAM, and so on. The ECU 6 is electrically connected to a variety of kinds of sensors such as an accelerator position sensor 7, a crank position sensor 8 and so on, in addition to the above-mentioned air flow meter 40, the first temperature sensor 52, the second temperature sensor 53. The accelerator position sensor 7 is a sensor which outputs an electrical signal correlated with an amount of operation (accelerator opening) of an unillustrated accelerator pedal. The crank position sensor 8 is a sensor which outputs an electrical signal correlated with the rotational position of an engine output shaft (crankshaft) of the internal combustion engine 1.

In addition, the ECU 6 is electrically connected to a variety of kinds of equipment such as the above-mentioned fuel injection valve 3, the intake throttle valve 41, the fuel addition valve 51, and so on. The ECU 6 controls the above-mentioned variety of kinds of equipment based on the output signals of the above-mentioned variety of kinds of sensors.

For example, the ECU 6 calculates an engine load and an engine rotation speed by using, as parameters, the output signals of the accelerator position sensor 7, the crank position sensor 8, and so on, and calculates a target amount of fuel injection and a target fuel injection timing based on the engine load and the engine rotation speed thus calculated. Then, the ECU 6 controls the fuel injection valve 3 according to the target amount of fuel injection and the target fuel injection timing. In addition, the ECU 6 carries out poisoning elimination processing for eliminating the sulfur components adhered to or deposited on the surface of the above-mentioned oxidation catalyst. Here, note that the ECU 6 may carry out poisoning elimination processing for eliminating the sulfur components adhered to or deposited on the surface of another catalyst (not shown) which is arranged at the downstream side of the oxidation catalyst. Here, a method of carrying out the poisoning elimination processing in the case of eliminating sulfur poisoning of the oxidation catalyst will be described.

(Method of Carrying Out Poisoning Elimination Processing)

The poisoning elimination processing referred to herein is to cause the sulfur components to desorb from the oxidation catalyst, by raising the temperature of the oxidation catalyst to a temperature (e.g., 300 degrees C.-600 degrees C.) at which the sulfur components desorb from the oxidation catalyst, when the amount of sulfur poisoning of the oxidation catalyst becomes equal to or more than a predetermined threshold value. The amount of sulfur poisoning of the oxidation catalyst is calculated (estimated) by using, as parameters, the sulfur concentration of the fuel and the integrated value of the amount of fuel injection. The estimation processing of the amount of sulfur poisoning is to be carried out in a periodic manner during the operation period of the internal combustion engine 1. Then, when the estimated value of the amount of sulfur poisoning becomes equal to or more than the predetermined threshold value, the ECU 6 causes the temperature of the oxidation catalyst to rise up to the temperature at which the sulfur components desorb from the oxidation catalyst.

As a method of raising the temperature of the oxidation catalyst, there can be adopted one in which when the oxidizing ability of the oxidation catalyst has been activated, fuel is caused to be added from the fuel addition valve 51, or fuel is caused to be injected from the fuel injection valve 3 of the cylinder 2 in the exhaust stroke, so that the fuel is supplied to the catalyst casing 50. According to such a method, the fuel supplied to the catalyst casing 50 is oxidized by the oxidation catalyst, and the oxidation catalyst is caused to rise in temperature due to the reaction heat generated at the time of the oxidation of the fuel.

In cases where the temperature of the oxidation catalyst is caused to rise according to the above-mentioned method, the ECU 6 adjusts the amount of fuel supply in such a manner that the temperature of the oxidation catalyst can be maintained at the temperature at which the sulfur components desorb from the oxidation catalyst. Moreover, the ECU 6 adjusts an amount of fuel supply per unit time in such a manner that an amount of the sulfur components to desorb from the oxidation catalyst per unit time becomes larger with respect to an amount of sulfur components to adhere to or deposit on the oxidation catalyst per unit time. Here, the amount of sulfur components to adhere to or deposit on the oxidation catalyst per unit time is correlated with an amount of the sulfur components to be supplied to the oxidation catalyst per unit time (a multiplied value of the amount of fuel supply per unit time and the sulfur concentration). In addition, the amount of the sulfur components to desorb from the oxidation catalyst per unit time can be obtained by using, as parameters, an amount of the oxidation catalyst carried or supported by the carrier in the catalyst casing 50 and the temperature of the oxidation catalyst. Accordingly, the amount of fuel supply should just be adjusted so that the amount of the sulfur components to be supplied to the oxidation catalyst per unit time becomes smaller with respect to the amount of the sulfur components to desorb from the oxidation catalyst per unit time.

As described above, when the poisoning elimination processing is carried out, the sulfur components adhered to or deposited on the oxidation catalyst will desorb from the oxidation catalyst. Here, note that the poisoning elimination processing is continuously carried out for a predetermined period of time so that the amount of sulfur poisoning of the oxidation catalyst becomes a fixed amount approximate to zero, and is ended at a point in time at which the above-mentioned predetermined period of time has elapsed.

However, the sulfur concentration of the fuel may not be constant, but vary according to fuel supply places or filling stations. Here, when a sulfur concentration used at the time of estimating the amount of sulfur poisoning becomes lower than an actual sulfur concentration, an estimated value of the amount of sulfur poisoning will become smaller than the actual amount of sulfur poisoning. For that reason, the amount of sulfur poisoning may become larger than the estimated value thereof, thus deteriorating exhaust emission, or when the temperature of the oxidation catalyst goes up, a large amount of sulfur components may desorb from the oxidation catalyst, thus producing white smoke in the atmosphere. Accordingly, in an internal combustion engine which is not provided with a unit for measuring the sulfur concentration of fuel, it is necessary to estimate the amount of sulfur poisoning, assuming the case where the sulfur concentration of the fuel is relatively high. However, according to such a method, there is the following problem. That is, the poisoning elimination processing will be carried out before the actual amount of sulfur poisoning becomes equal to or more than the predetermined threshold value, so that the frequency of the execution of the poisoning elimination processing may be increased unnecessarily (for example, the poisoning elimination processing is carries out, each time the vehicle with the internal combustion engine 1 mounted thereon travels tens of kilometers or hundreds of kilometers).

Accordingly, in the case where the filling or refueling of fuel has been carried out, it is desirable to determine the sulfur concentration of fuel after refueling (i.e., mixed fuel of residual fuel, which has remained in a fuel tank at the time of refueling, and newly filled fuel), and to estimate the amount of sulfur poisoning of the oxidation catalyst based on the sulfur concentration thus determined. Accordingly, in this embodiment, in cases where the internal combustion engine 1 is operated for the first time after refueling of fuel, when first poisoning elimination processing has ended, the ECU 6 is configured to carry out concentration determination processing for determining the sulfur concentration of the mixed fuel. Hereinafter, reference will be made to a method of carrying out the concentration determination processing in this embodiment. Here, this method is configured such that in a period of time from the time the internal combustion engine 1 is operated (started) for the first time after the refueling of fuel until the concentration determination processing to be described later in detail is ended, the amount of sulfur poisoning of the oxidation catalyst is estimated, assuming the case where the concentration of the sulfur components contained in the mixed fuel after the refueling is the highest (e.g., equal to or more than 1,000 ppm), and when the estimated value thus obtained becomes equal to or more than the predetermined threshold value, the poisoning elimination processing is carried out.

(Method of Carrying Out Concentration Determination Processing)

The concentration determination processing in this embodiment is processing in which in the case where the internal combustion engine 1 is operated for the first time after the refueling of fuel, when the first poisoning elimination processing with respect to the oxidation catalyst has been ended, the oxidation catalyst is caused to be subjected to sulfur poisoning in a short period of time by continuously supplying fuel to the oxidation catalyst, and the sulfur concentration of the mixed fuel is determined based on the change over time of the temperature of the oxidation catalyst in that case.

Specifically, in the case where the internal combustion engine 1 is operated for the first time after the refueling of fuel, the ECU 6 starts the processing of supplying fuel to the catalyst casing 50 (fuel supply processing) after the end of the first poisoning elimination processing and when the temperature of the oxidation catalyst is equal to or higher than a predetermined reference temperature, and ends the fuel supply processing when the temperature of the oxidation catalyst has dropped to equal to or less than the predetermined temperature. Then, the ECU 6 determines the sulfur concentration of the mixed fuel after the refueling, based on a period of time required from the start of the fuel supply processing until the end thereof.

The fuel supply processing is carried out by using a method of adding fuel from the fuel addition valve 51, or a method of injecting fuel from the fuel injection valve 3 during the exhaust stroke of the cylinder 2. At that time, the ECU 6 controls the fuel addition valve 51 or the fuel injection valve 3 in such a manner that the amount of fuel to be supplied to the catalyst casing 50 per unit time becomes a fixed amount of supply. The fixed amount of supply referred to herein is set in such a manner that the amount of the sulfur components to adhere to or deposit on the oxidation catalyst per unit time becomes larger with respect to the amount of the sulfur components to desorb from the oxidation catalyst per unit time.

Here, although the amount of sulfur components to adhere to or deposit on the oxidation catalyst per unit time changes according to the sulfur concentration of the fuel, the sulfur concentration of the fuel becomes unknown at the point in time when the fuel supply processing is started. For that reason, the above-mentioned fixed amount of supply is to be set by assuming the case where the sulfur concentration of the fuel is the lowest. When the fixed amount of supply is set in such a manner, the amount of the sulfur components to adhere to or deposit on the oxidation catalyst per unit time surely becomes larger with respect to the amount of the sulfur components to desorb from the oxidation catalyst per unit time.

Figure 2:
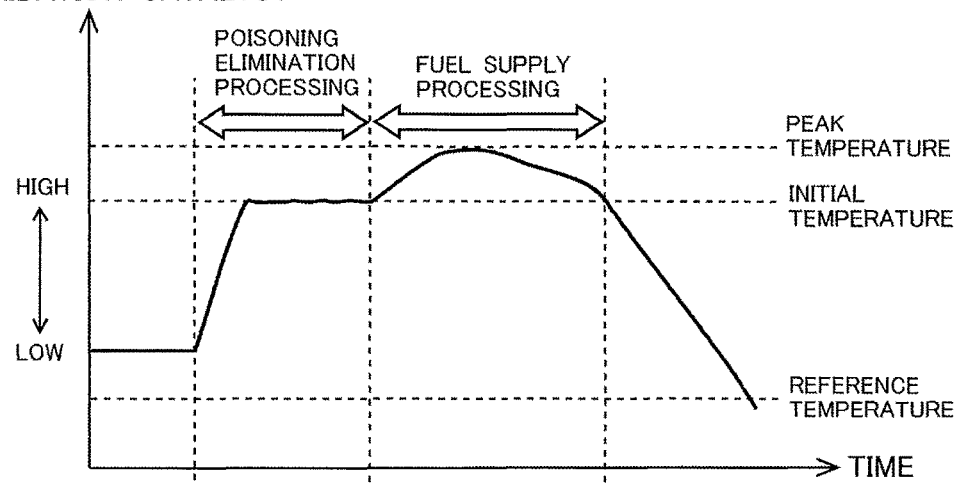
FIG. 2 is a timing chart showing the changes over time of the temperature of an oxidation catalyst, the amount of sulfur poisoning of the oxidation catalyst, and the amount of fuel supplied to the oxidation catalyst (the amount of fuel supply) in the case where poisoning elimination processing and fuel supply processing are carried out, in the first embodiment.
Figure 2:
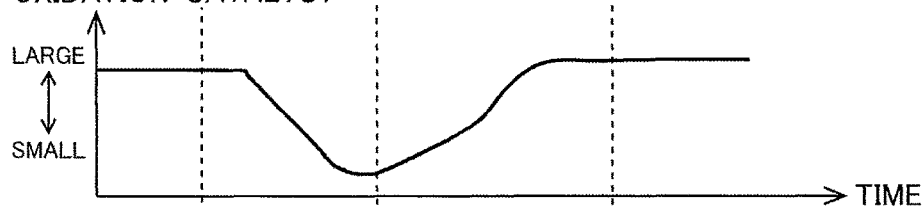
Figure 2:
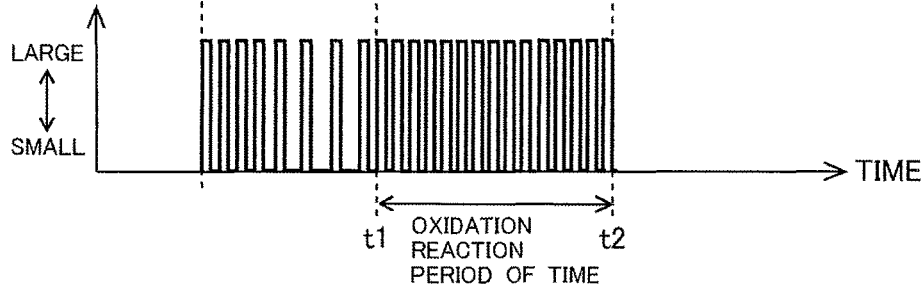

When the fuel supply processing according to the above-mentioned method is continuously carried out, as shown in FIG. 2, the amount of sulfur poisoning of the oxidation catalyst is sufficiently small at the beginning when the fuel supply processing has been started, so that the supplied fuel is oxidized by the oxidation catalyst to generate heat, and the temperature of the oxidation catalyst is caused to rise by means of the heat of reaction thus generated. After that, the sulfur components contained in the supplied fuel adhere to or deposit on the oxidation catalyst, so the amount of sulfur poisoning of the oxidation catalyst increases. As the amount of sulfur poisoning of the oxidation catalyst increases, the amount of fuel oxidized by the oxidation catalyst decreases. Then, when most of the oxidation catalyst is covered with the sulfur components, the oxidation catalyst falls into the deactivated state, so the supplied fuel becomes substantially unable to be oxidized. Accordingly, in cases where the fuel supply processing is continuously carried out, the temperature of the oxidation catalyst shows a rising tendency after the starting point in time (t1 in FIG. 2) of the fuel supply processing, and changes to a falling tendency subsequently when the amount of sulfur poisoning becomes large. Then, when the oxidation catalyst is deactivated, the temperature of the oxidation catalyst finally drops to an initial temperature (t2 in FIG. 2) or below.

Figure 3:
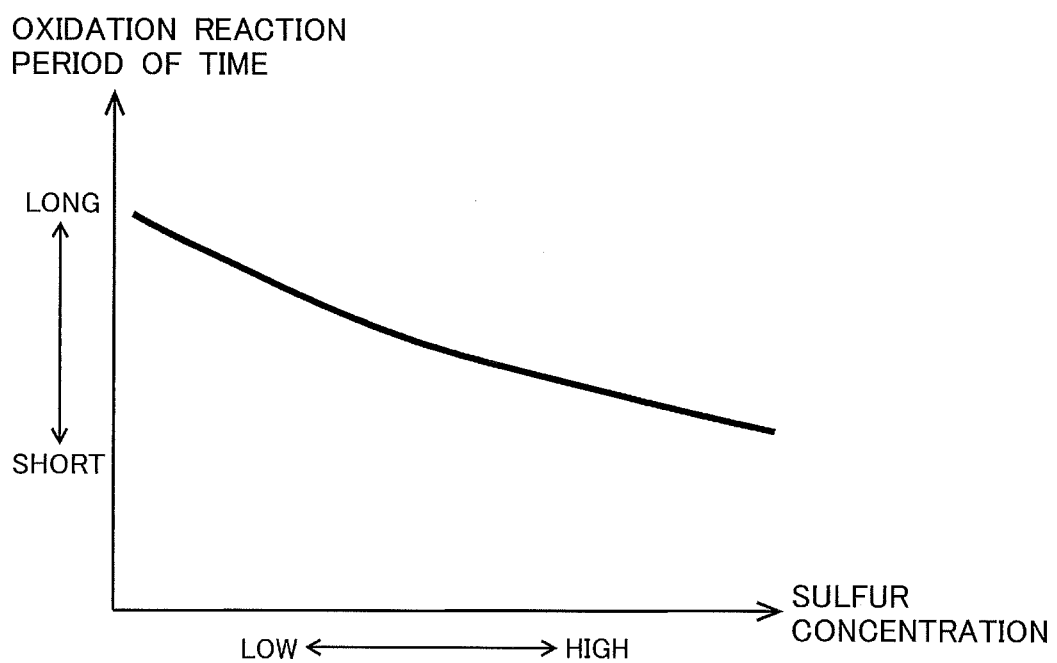
FIG. 3 is a view showing the correlation between the oxidation reaction period of time and the sulfur concentration of the fuel.

Here, when the above-mentioned predetermined temperature is set to a temperature which is equal to or higher than the initial temperature and is lower than the highest temperature (a peak temperature in FIG. 2) which the oxidation catalyst can take at the time of execution of the fuel supply processing, a period of time (an oxidation reaction period of time) required to drop to the predetermined temperature or below from the starting point in time of the fuel supply processing after the temperature of the oxidation catalyst has once risen up to a temperature, which is higher than the initial temperature and the predetermined temperature, becomes shorter in the case where the sulfur concentration of the fuel is high than in the case where it is low. For example, the higher the sulfur concentration of the fuel, the shorter becomes the oxidation reaction period of time, as shown in FIG. 3. Accordingly, the relation as shown in FIG. 3 has been obtained experimentally in advance, and stored in the ROM of the ECU 6 in the form of a map or a function expression, whereby an absolute amount of the sulfur concentration can be determined by using the oxidation reaction period of time as an argument.

Here, note that the oxidation reaction period of time may also change with the initial temperature or the predetermined temperature, even if the sulfur concentration of the fuel is fixed or constant. Specifically, when the initial temperature is equal to or higher than a temperature (i.e., a desorption temperature) at which the sulfur components are able to desorb, the difference in the initial temperature does not substantially influence the oxidation reaction period of time, but when the initial temperature is lower than the desorption temperature, the oxidation reaction period of time may change according to the initial temperature. For example, in cases where the initial temperature is lower than the desorption temperature, it takes a certain period of time for the temperature of the oxidation catalyst to rise up to the desorption temperature or above after the fuel supply processing is started, and the period of time required at that time becomes longer as the initial temperature becomes lower.

Therefore, by setting the reference temperature to a temperature equal to or higher than the desorption temperature, the initial temperature may be made to become equal to or higher than the desorption temperature. However, when the reference temperature is set to the temperature equal to or higher than the desorption temperature, the opportunity of execution of the concentration determination processing may become small. Accordingly, the reference temperature may be set to a temperature lower than the desorption temperature. In that case, the relation between the oxidation reaction period of time and the sulfur concentration of the fuel has been obtained at each temperature in the range from the reference temperature to the desorption temperature, and has been stored in the ROM of the ECU 6 in the form of a map or a function expression. Then, the ECU 6 obtains the sulfur concentration corresponding to the oxidation reaction period of time from the map or function expression which meets the initial temperature. According to such a method, in cases where the initial temperature is lower than the desorption temperature, it becomes possible to determine the sulfur concentration of the mixed fuel in an accurate manner.

However, when the temperature of the exhaust gas flowing into the catalyst casing 50 during the execution of the fuel supply processing changes, the oxidation reaction period of time will accordingly change, thus giving rise to a possibility that the oxidation reaction period of time deviates from a period of time corresponding to the actual sulfur concentration. Accordingly, in cases where the amount of change of the temperature of the exhaust gas exceeds a permissible amount set experimentally in advance during the execution of the fuel supply processing, it is desirable to stop the fuel supply processing and to stop the concentration determination processing. The permissible amount referred to herein is an amount in which it is considered to be unable to determine the sulfur concentration of the fuel in an accurate manner, when the amount of change in the temperature of the exhaust gas during the execution of the fuel supply processing. Here, note that the fuel supply processing may be carried out, when the temperature of the exhaust gas is in a stable state such as in the case where the internal combustion engine 1 is in a steady operating state such as idle operation. In addition, when the fuel supply processing is carried out in a state where the oxidizing ability of the oxidation catalyst is easy to change according to the change in temperature of the oxidation catalyst, the above-mentioned change over time of the temperature of the oxidation catalyst as shown in FIG. 2 may not be exhibited, or the oxidation reaction period of time may deviate from the period of time corresponding to the actual sulfur concentration. Accordingly, when the temperature of the oxidation catalyst is equal to or higher than the predetermined reference temperature, after the end of the poisoning elimination processing, the above-mentioned fuel supply processing is carried out. The reference temperature referred to herein is a temperature which is equal to or higher than an activation temperature of the oxidation catalyst (e.g., a temperature at which the conversion ratio (oxidation ratio) of fuel by the oxidation catalyst becomes equal to or more than 80%), and preferably a temperature at which the change of the purification rate of the oxidation catalyst becomes slight, even if the temperature of the oxidation catalyst changes from the reference temperature to some extent.

In a period of time from the first starting of the internal combustion engine 1 after the refueling of fuel until the ending of the concentration determination processing, however, there is a high possibility that the sulfur concentration used for the estimation of the amount of sulfur poisoning is different from the actual sulfur concentration. For that reason, it is desirable to carry out the concentration determination processing at an early time after the refueling of fuel. Accordingly, the first poisoning elimination processing after the refueling of fuel may be carried out before the estimated value of the amount of sulfur poisoning becomes equal to or more than the predetermined threshold value. For example, in cases where the internal combustion engine 1 is operated for the first time after the refueling of fuel, the first poisoning elimination processing may be carried out, when the oxidizing ability of the oxidation catalyst is activated. According to such a method, the first poisoning elimination processing is carried out at an early time after the refueling of fuel, and subsequently, the concentration determination processing can be carried out.

Figure 4:
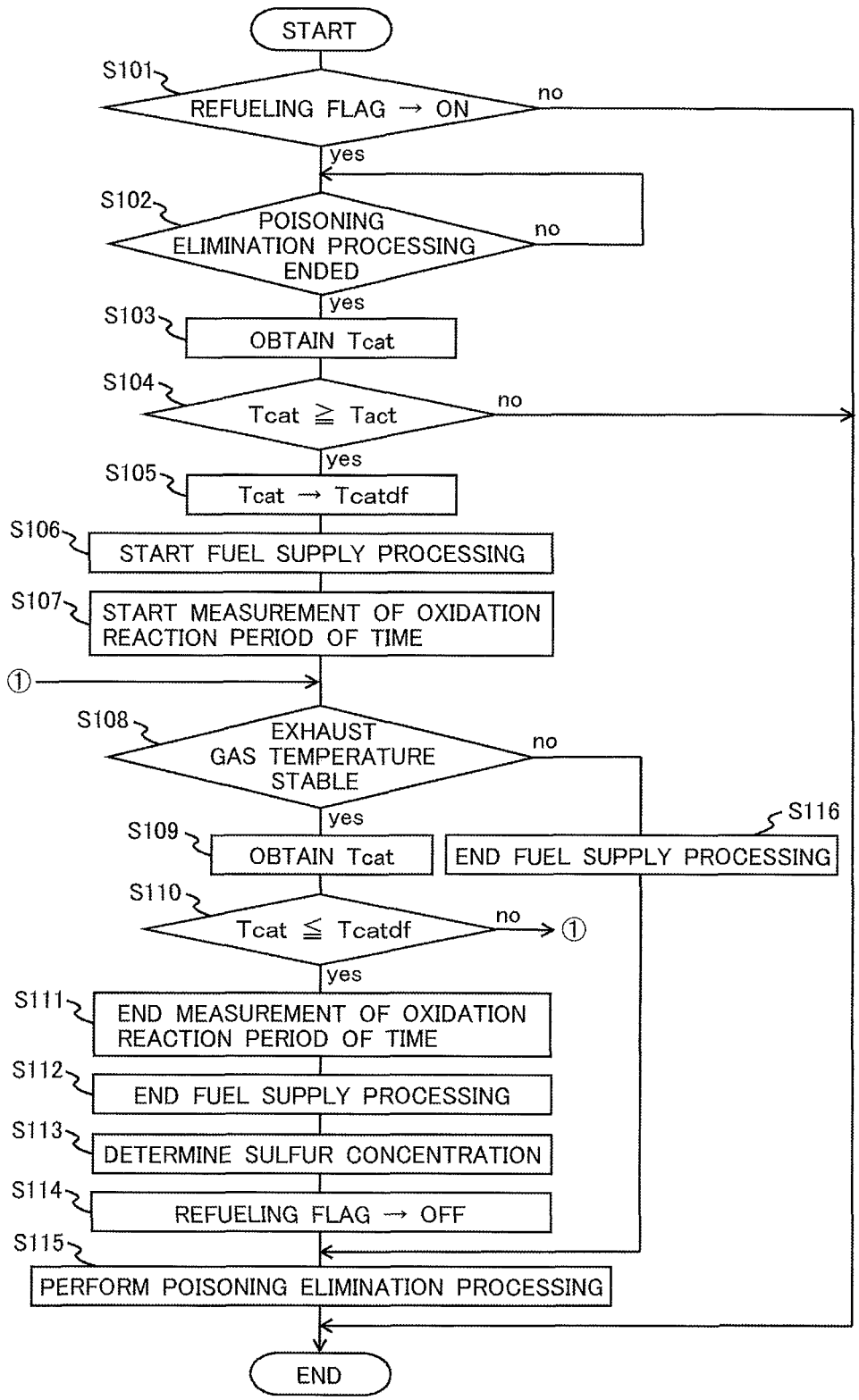
FIG. 4 is a flow chart showing a processing routine which is executed by an ECU at the time of determining the sulfur concentration of the fuel, in the first embodiment.

In the following, an execution procedure of the concentration determination processing in this embodiment will be described in line with FIG. 4. FIG. 4 is a flow chart showing a processing routine which is executed by the ECU 6 at the time of determining the sulfur concentration of the fuel. The processing routine shown in FIG. 4 is carried out by the ECU 6 in a repeated manner during the operation period of the internal combustion engine 1, and has been stored in advance in the ROM of the ECU 6.

In the processing routine of FIG. 4, first in the processing of step S101, the ECU 6 determines whether a refueling flag is on. The refueling flag is turned on when the supply or refueling of fuel is detected, and is turned off when the concentration determination processing has been ended. Here, note that the refueling of fuel may be detected based on a signal from a sensor which detects opening and closing of an unillustrated fuel supply opening, or may be detected based on a signal from a sensor which detects an amount of fuel stored in the fuel tank. In cases where a negative determination is made in the processing of step S101, the ECU 6 ends the execution of this processing routine. On the other hand, in cases where an affirmative determination is made in the processing of step S101, the routine of the ECU 6 goes to the processing of step S102.

In the processing of step S102, the ECU 6 determines whether the poisoning elimination processing has ended. For example, the ECU 6 may determine whether the poisoning elimination processing has ended, by making reference to a flag which is turned on when the poisoning elimination processing has ended, and which is turned off when a subsequent amount of sulfur poisoning of the oxidation catalyst has reached a predetermined determination amount. The predetermined determination amount referred to herein is an amount which is smaller than the above-mentioned predetermined threshold value used when determining the time of the execution of the poisoning elimination processing, and at which it is considered that it is unable to determine the sulfur concentration of the fuel in an accurate manner, when the concentration determination processing is carried out in a state where the amount of sulfur poisoning of the oxidation catalyst is equal to or more than the predetermined determination amount. Here, as described above, it is desired that in the period of time from the time the internal combustion engine 1 is operated (started) for the first time after the refueling of fuel until the concentration determination processing ends, the amount of sulfur poisoning of the oxidation catalyst be estimated, assuming the case where the concentration of the sulfur components contained in the mixed fuel after the refueling is the highest, and that the poisoning elimination processing be carried out when the estimated value thus obtained becomes equal to or more than the predetermined threshold value. Accordingly, the poisoning elimination processing referred to herein should also be carried out when the amount of sulfur poisoning estimated assuming the case where the concentration of fuel is the highest becomes equal to or more than the predetermined threshold value. However, the first poisoning elimination processing after the refueling of fuel may be carried out before the estimated value of the amount of sulfur poisoning becomes equal to or more than the predetermined threshold value. For example, in cases where the internal combustion engine 1 is operated for the first time after the refueling of fuel, the first poisoning elimination processing may be carried out, when the oxidizing ability of the oxidation catalyst is activated. In that case, the time of the execution of the poisoning elimination processing can be brought forward, and the time of the execution of the concentration determination processing can also accordingly be made early.

In cases where a negative determination is made in the above-mentioned processing of step S102, the ECU 6 carries out the processing of step S102 in a repeated manner until the poisoning elimination processing ends. On the other hand, in cases where an affirmative determination is made in the processing of step S102, the routine of the ECU 6 goes to the processing of step S103. In the processing of step S103, the ECU 6 obtains the temperature (bed temperature) Tcat of the oxidation catalyst. At that time, the ECU 6 may estimate the temperature Tcat of the oxidation catalyst by using, as a parameter, a difference between a measured value of the first temperature sensor 52 and a measured value of the second temperature sensor 53. In addition, the ECU 6 may use the measured value of the second temperature sensor 53 as the temperature Tcat of the oxidation catalyst.

In the processing of step S104, the ECU 6 determines whether the temperature Tcat of the catalyst obtained in the above-mentioned processing of step S103 is equal to or higher than the above-mentioned reference temperature Tact. In cases where a negative determination is made in the processing of step S104 (Tcat<Tact), the ECU 6 ends the execution of this processing routine, without carrying out the concentration determination processing. In that case, the execution of the concentration determination processing is carried over to the end of the next and subsequent poisoning elimination processing. Here, note that in a period of time until the end of the concentration determination processing after the refueling of fuel, the amount of sulfur poisoning of the oxidation catalyst is to be estimated by assuming the case where the sulfur concentration of the fuel is the highest (e.g., 1,000 ppm). On the other hand, in cases where an affirmative determination is made in the processing of step S104 (Tcat≥Tact), the ECU 6 determines the sulfur concentration of the mixed fuel, by carrying out the sequential execution of the processing of from step S105 to step S113.

First, in the processing of step S105, the ECU 6 stores the temperature Tcat obtained in the processing of step S103 into the RAM or the backup RAM as a predetermined temperature Tcatdf. Subsequently, the routine of the ECU 6 goes to the processing of step S106, where the fuel supply processing is started. In that case, the ECU 6 controls the fuel injection valve 3 or the fuel addition valve 51 in such a manner that the amount of fuel to be supplied to the catalyst casing 50 per unit time becomes a fixed amount of supply. The fixed amount of supply at that time is an amount which is set in such a manner that in the case of assuming the situation where the sulfur concentration of the fuel is the lowest, the amount of the sulfur components to adhere to or deposit on the oxidation catalyst per unit time becomes larger in comparison with the amount of the sulfur components to desorb from the oxidation catalyst per unit time.

In the processing of step S107, the ECU 6 starts measuring the oxidation reaction period of time. Subsequently, in the processing of step S108, the ECU 6 determines whether the temperature of the exhaust gas is stable. Specifically, in cases where a difference between a measured value of the first temperature sensor 52 at the time of the start of the fuel supply processing and a measured value of the first temperature sensor 52 at the current point in time is equal to or less than the above-mentioned permissible amount, the ECU 6 may make a determination that the temperature of the exhaust gas is stable, whereas in cases where the above difference exceeds the permissible amount, the ECU 6 may make a determination that the temperature of the exhaust gas is not stable. In cases where an affirmative determination is made in the above-mentioned processing of step S108, the routine of the ECU 6 goes to the processing of step S109.

In the processing of step S109, the ECU 6 obtains the temperature Tcat of the oxidation catalyst after the start of the fuel supply processing. Then, in the processing of S110, the ECU 6 determines whether the temperature Tcat obtained in the processing of step S109 has dropped to a temperature equal to or lower than the predetermined temperature Tcatdf stored in the RAM or the backup RAM in the above-mentioned processing of step S105. Here, it is determined whether the temperature of the oxidation catalyst has dropped to the predetermined temperature Tcatdf or below once having risen up to a temperature which is higher than the initial temperature and the predetermined temperature Tcatdf. In cases where a negative determination is made in the processing of step S110 (Tcat>Tcatdf), the routine of the ECU 6 returns to the processing of step S108. On the other hand, in cases where an affirmative determination is made in the processing of step S110 (Tcat≤Tcatdf), the routine of the ECU 6 goes to the processing of step S111. In the processing of step S111, the ECU 6 ends measuring the oxidation reaction period of time.

In the processing of step S112, the ECU 6 ends the fuel supply processing. Subsequently, the ECU 6 goes to the processing of step S113, where the sulfur concentration of the mixed fuel after the refueling is determined by using, as a parameter, the oxidation reaction period of time at the time when the above-mentioned processing of step S111 has been carried out. At that time, the ECU 6 may determine an absolute amount of the sulfur concentration based on the above-mentioned relation as shown in FIG. 3. Also, the ECU 6 may determine whether sulfur is contained in the fuel. In that case, when the oxidation reaction period of time is smaller than a predetermined determination value, the ECU 6 may make a determination that sulfur is contained in the fuel, whereas when the oxidation reaction period of time is equal to or larger than the predetermined determination value, the ECU 6 may also make a determination that sulfur is not contained in the fuel. Here, note that, as mentioned above, when the fuel supply processing is started in a state where the initial temperature is lower than the above-mentioned desorption temperature, the oxidation reaction period of time may change with the initial temperature. Accordingly, in the processing of step S113, the absolute amount of the sulfur concentration may be determined based on a map or function expression corresponding to the initial temperature, or a determination as to whether sulfur components are contained in the mixed fuel may be made, after correcting the above-mentioned oxidation reaction period of time or the above-mentioned predetermined determination value according to the initial temperature.

When the ECU 6 ends the execution of the processing of step S113, it turns off the refueling flag in the processing of step S114. Subsequently, the ECU 6 carries out poisoning elimination processing in the processing of step S115. The poisoning elimination processing carried out in the processing of step S115 is performed according to a method of raising the temperature of the oxidation catalyst to the above-mentioned desorption temperature by supplying fuel to the oxidation catalyst from the fuel addition valve 51 or the fuel injection valve 3, similar to the poisoning elimination processing carried out before the execution of the fuel supply processing. Thus, when the poisoning elimination processing is carried out after the end of the fuel supply processing, it is possible to suppress the decrease in the purification or reduction performance of the oxidation catalyst resulting from the execution of the fuel supply processing.

Here, note that when the amount of change in the temperature of the exhaust gas exceeds the above-mentioned permissible amount in the course of the execution of the fuel supply processing by means of the ECU 6, a negative determination will be made in the above-mentioned processing of step S108. In that case, the routine of the ECU 6 goes to the processing of step S116, and stops the execution of the fuel supply processing. Subsequently, the routine of the ECU 6 goes to the processing of step S115, and carries out the poisoning elimination processing. In that case, when completing the execution of the processing of step S115, the ECU 6 may redo the above-mentioned processing in and after step S103.

In this manner, when the concentration determination processing is carried out according to the processing routine of FIG. 4, the sulfur concentration of the fuel can be determined, without using a special sensor such as a SOx sensor, etc.

Embodiment 2

Next, reference will be made to a second embodiment of the present invention based on FIGS. 5 and 6. Here, a construction different from that of the above-mentioned first embodiment will be described, and an explanation of the same construction will be omitted.

In the above-mentioned first embodiment, there has been described an example in which the poisoning elimination processing is carried out by supplying fuel to the catalyst casing 50 from the fuel addition valve 51 or the fuel injection valve 3, but in this second embodiment, another example will be carried out in which poisoning elimination processing is carried out by raising the oxidation catalyst, without being accompanied by the supply of fuel to the catalyst casing 50.

Figure 5:
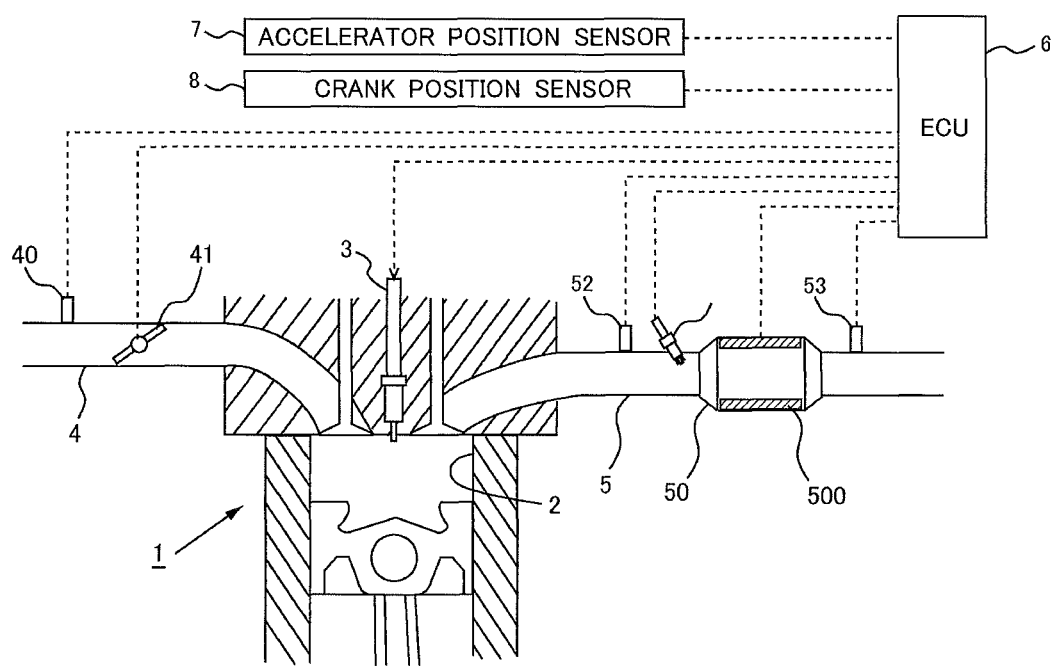
FIG. 5 is a view showing the schematic construction of an internal combustion engine to which the present invention is applied, in a second embodiment.

FIG. 5 is a view showing the schematic construction of an internal combustion engine according to this second embodiment. In FIG. 5, the same symbols are attached to the same or like components as those in the above-mentioned first embodiment. In FIG. 5, the catalyst casing 50 is equipped with an electric heater 500 that serves to heat the oxidation catalyst by converting electrical energy into heat energy. Here, note that the electric heater 500 corresponds to a "heating device" according to the present invention.

In the internal combustion engine 1 constructed in this manner, at the time of carrying out the first poisoning elimination processing after the refueling of fuel, the ECU 6 operates the electric heater 500 so as to raise the temperature of the oxidation catalyst to the desorption temperature or above, instead of supplying fuel to the catalyst casing 50 from the fuel injection valve 3 or the fuel addition valve 51.

Figure 6:
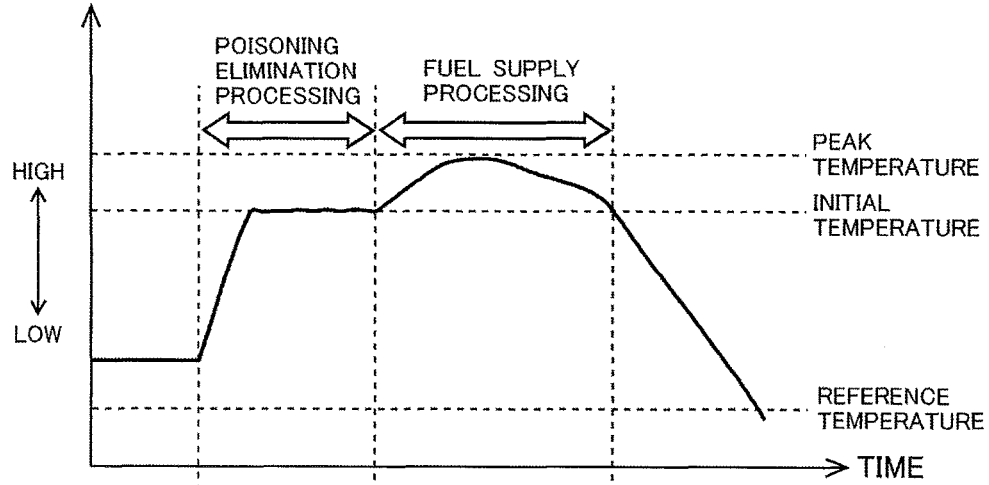
FIG. 6 is a timing chart showing the changes over time of the temperature of an oxidation catalyst, the amount of sulfur poisoning of the oxidation catalyst, the operating state of an electric heater, and the amount of fuel supplied to the oxidation catalyst (the amount of fuel supply) in the case where poisoning elimination processing and fuel supply processing are carried out, in the second embodiment.
Figure 6:
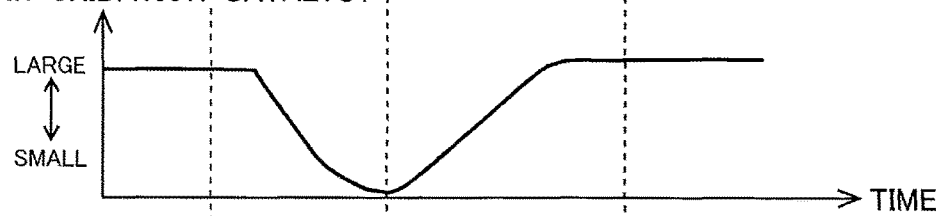
Figure 6:
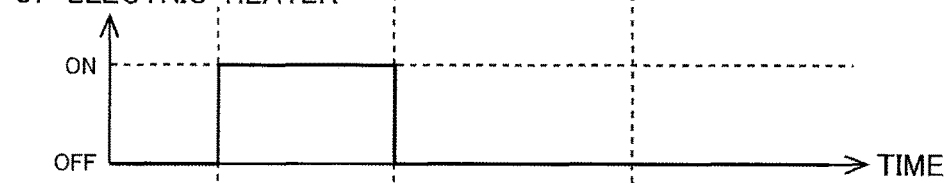
Figure 6:
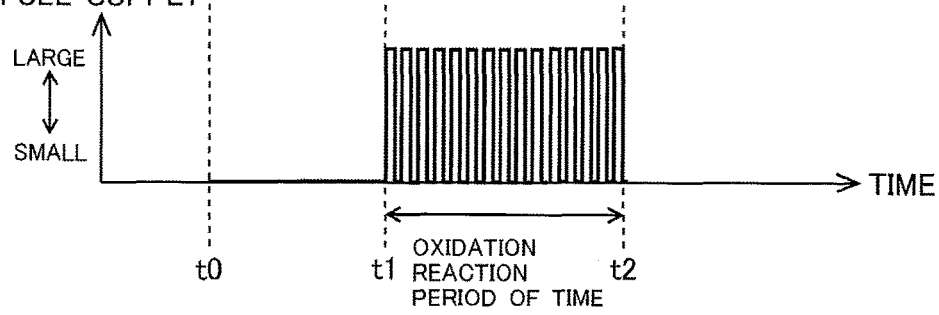

Specifically, as shown in FIG. 6, when the first poisoning elimination processing is carried out after the refueling of fuel (at t0 in FIG. 6), the electric heater 500 is operated or turned on thereby to raise the oxidation catalyst to the desorption temperature or above, without carrying out the supply of fuel from the fuel injection valve 3 or the fuel addition valve 51. At that time, the electric heater 500 may be controlled in such a manner that the energization period of time and the non-energization period of time thereof are duty controlled so as to maintain the oxidation catalyst in a desired temperature range which is equal to or higher than the desorption temperature. In addition, the operating time of the electric heater 500 should be set to a sufficient period of time for eliminating the sulfur poisoning of the oxidation catalyst (i.e., a period of time corresponding to the above-mentioned predetermined period of time). Then, the ECU 6 starts concentration determination processing, when the temperature of the oxidation catalyst is equal to or higher than the reference temperature at the time the poisoning elimination processing by the electric heater 500 has ended (at t1 in FIG. 6). At that time, the concentration determination processing is carried out according to the processing routine of FIG. 4, similar to the above-mentioned first embodiment.

Here, as described in the above-mentioned first embodiment, when the poisoning elimination processing is carried out by the method of supplying fuel to the catalyst casing 50 from the fuel injection valve 3 or the fuel addition valve 51, the sulfur components contained in the supplied fuel adhere or deposit on the oxidation catalyst, so that some of the sulfur components may remain in the oxidation catalyst at the end of the poisoning elimination processing, and a residual amount of the sulfur components in that case may not be stabilized to a fixed amount. Accordingly, when the poisoning elimination processing is carried out by a method of supplying fuel to the catalyst casing 50 from the fuel injection valve 3 or the fuel addition valve 51 immediately before the concentration determination processing, the accuracy of the determination in the concentration determination processing may decrease under the influence of the sulfur components having adhered to or deposited on the oxidation catalyst at the end of the poisoning elimination processing.

On the other hand, as described in the above-mentioned explanation of FIG. 6, when the poisoning elimination processing is carried out by the method of heating the oxidation catalyst by means of the electric heater 500, the amount of the sulfur components having adhered to or deposited on the oxidation catalyst at the end of the poisoning elimination processing can be made substantially zero. Accordingly, when the poisoning elimination processing using the electric heater 500 is carried out immediately before the execution of the concentration determination processing, it becomes possible to determine the sulfur concentration of the fuel in a more accurate manner.

Here, note that with poisoning elimination processing without accompanying the concentration determination processing (i.e., poisoning elimination processing which is carried out after the refueling of fuel, and after the end of the concentration determination processing of the mixed fuel), either one of the following two modes may also be selected according to the operating state of the internal combustion engine 1: a mode in which the temperature of the oxidation catalyst is caused to rise by the method of supplying fuel to the catalyst casing 50 from the fuel injection valve 3 or the fuel addition valve 51 (i.e., a first temperature raising mode); and another mode in which the temperature of the oxidation catalyst is raised by the method of heating the oxidation catalyst by means of the heating device (i.e., a second temperature raising mode). However, poisoning elimination processing accompanying the concentration determination processing (i.e., concentration determination processing which is carried out after the refueling of fuel and before the end of the concentration determination processing of the mixed fuel) should be carried out in the second temperature raising mode irrespective of the operating state of the internal combustion engine 1.

In addition, in this second embodiment, as "the heating device" according to the present invention, there has been mentioned the electric heater 500 by way of example, but there can instead be used, as such device, anything which can heat the oxidation catalyst without accompanying the supply of fuel to the oxidation catalyst.

Embodiment 3

Figure 7:
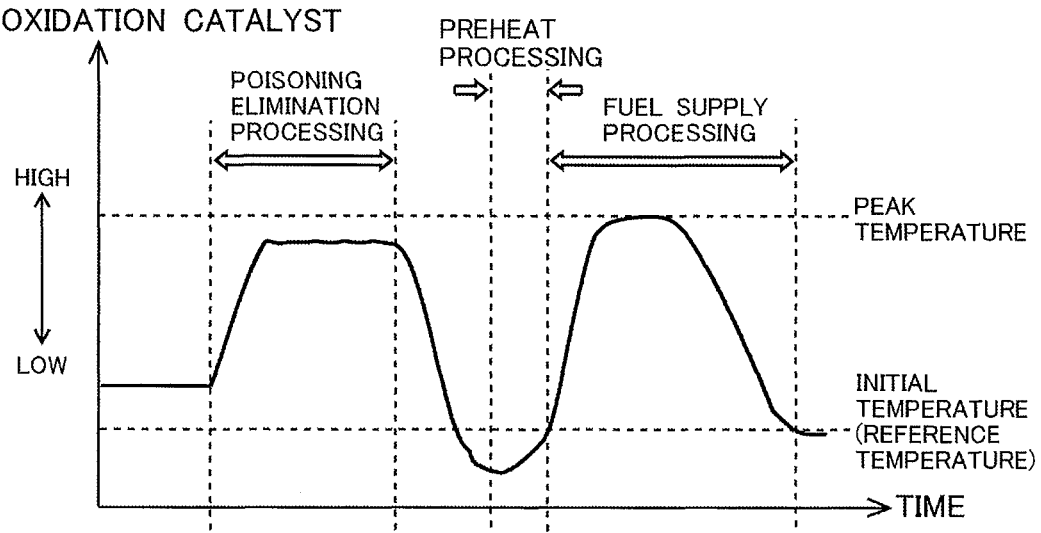
FIG. 7 is a timing chart showing the changes over time of the temperature of an oxidation catalyst, the amount of sulfur poisoning of the oxidation catalyst, the operating state of an electric heater, and the amount of fuel supplied to the oxidation catalyst (the amount of fuel supply) in the case where poisoning elimination processing and fuel supply processing are carried out, in a third embodiment.
Figure 7:
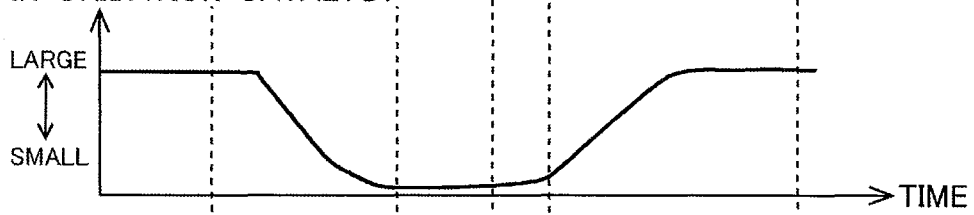
Figure 7:
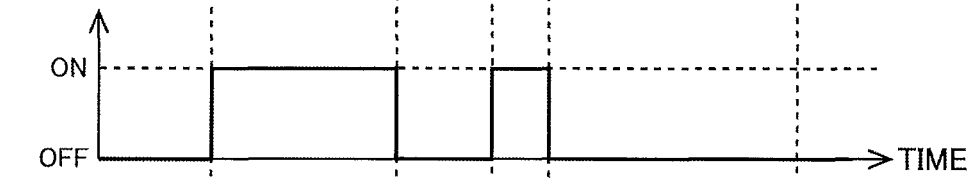
Figure 7:
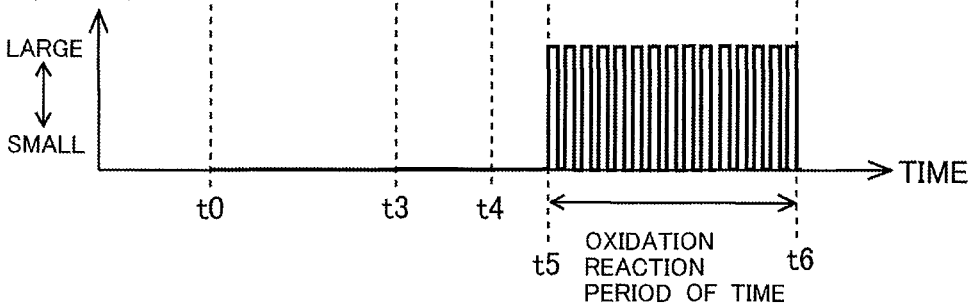

Next, reference will be made to a third embodiment of the present invention based on FIGS. 7 and 8. Here, a construction different from that of the above-mentioned first or second embodiment will be described, and an explanation of the same or like construction will be omitted.

In the above-mentioned first and second embodiments, there has been described an example in which when the temperature of the oxidation catalyst drops to less than the reference temperature after the first poisoning elimination processing after the refueling of fuel has ended, the execution of the concentration detection processing is carried over until the next poisoning elimination processing ends. In contrast to this, in this third embodiment, reference will be made to an example in which when the temperature of the oxidation catalyst drops to less than the reference temperature after the first poisoning elimination processing after the refueling of fuel has ended, the execution of the concentration detection processing is carried out by raising the temperature of the oxidation catalyst to the above-mentioned reference temperature or above.

When the first poisoning elimination processing after the refueling of fuel has ended, a fuel cut-off operation of the internal combustion engine 1 may be carried out. Thus, when the fuel supply processing is carried out in the case where the fuel cut-off operation of the internal combustion engine 1 is being carried out, there will be a possibility that the oxidation catalyst is cooled by exhaust gas of low temperature, whereby the above-mentioned oxidation reaction period of time may becomes other than a period of time corresponding to an actual sulfur concentration. Accordingly, in the case where the fuel cut-off operation of the internal combustion engine 1 is carried out when the first poisoning elimination processing after the refueling of fuel has ended, the sulfur concentration of the mixed fuel can not be determined immediately. In such a case, when the execution of the concentration determination processing is carried over until the end of the next poisoning elimination processing, the amount of sulfur poisoning of the oxidation catalyst can not be estimated in an accurate manner, in a period of time until the next poisoning elimination processing ends.

Accordingly, in this third embodiment, when the fuel cut-off operation of the internal combustion engine 1 is carried out at the end of the first poisoning elimination processing after the refueling of fuel, the concentration determination processing is carried out, after being made to wait until the end of the fuel cut-off operation. Here, note that when the fuel cut-off operation of the internal combustion engine 1 is carried out at the end of the first poisoning elimination processing after the refueling of fuel, the temperature of the oxidation catalyst may drop to less than the reference temperature at the time when the fuel cut-off operation has ended. For that reason, in this third embodiment, when the temperature of the oxidation catalyst at the time of the ending of the fuel cut-off operation is lower than the reference temperature, the processing of raising the temperature of the oxidation catalyst up to the reference temperature or above by means of the electric heater 500 (preheating processing) is carried out, so that the fuel supply processing is started at the time when the temperature of the oxidation catalyst has risen up to the reference temperature or above.

Here, based on FIG. 7, reference will be made to a procedure for carrying out the concentration determination processing in the case where the fuel cut-off operation of the internal combustion engine 1 is carried out when the first poisoning elimination processing after the refueling of fuel has ended. In FIG. 7, when the fuel cut-off operation of the internal combustion engine 1 is carried out at the end of the poisoning elimination processing (at t3 in FIG. 7), the oxidation catalyst is cooled by the exhaust gas of low temperature, so that the temperature of the oxidation catalyst drops. Thereafter, when the temperature of the oxidation catalyst has dropped to less than the reference temperature at the end of the fuel cut-off operation (at t4 in FIG. 7), the electric heater 500 is operated or turned on to carry out the preheating processing. Then, when the temperature of the oxidation catalyst goes up to the reference temperature or above (at t5 in FIG. 7), the electric heater 500 is stopped or turned off, whereby the preheating processing is ended, and at the same time, the fuel supply processing is started. The fuel supply processing is continuously carried out until the time (at t6 in FIG. 7) at which the temperature of the oxidation catalyst drops to a predetermined temperature (e.g., the reference temperature in the example shown in FIG. 7) or below, after having once risen up to a temperature which is higher than an initial temperature (e.g., the reference temperature in the example shown in FIG. 7).

In this manner, when the preheating processing of the oxidation catalyst is carried out by the use of the electric heater 500, the temperature of the oxidation catalyst can be raised to the reference temperature or above, without advancing the poisoning of the oxidation catalyst. As a result, even in the case where the fuel cut-off operation of the internal combustion engine 1 is carried out when the first poisoning elimination processing after the refueling of fuel has ended, the sulfur concentration of the fuel can be determined at the earliest possible time.

In the following, an execution procedure of the concentration determination processing in this third embodiment will be described in line with FIG. 8. FIG. 8 is a flow chart showing a processing routine which is executed by the ECU 6 at the time of determining the sulfur concentration of the fuel. Here, processing different from the above-mentioned processing routine of FIG. 4 will be described, and an explanation of the same or like processing will be omitted. Here, note that in FIG. 8, the same symbols are attached to the same processing as in the above-mentioned processing routine of FIG. 4.

Figure 8:
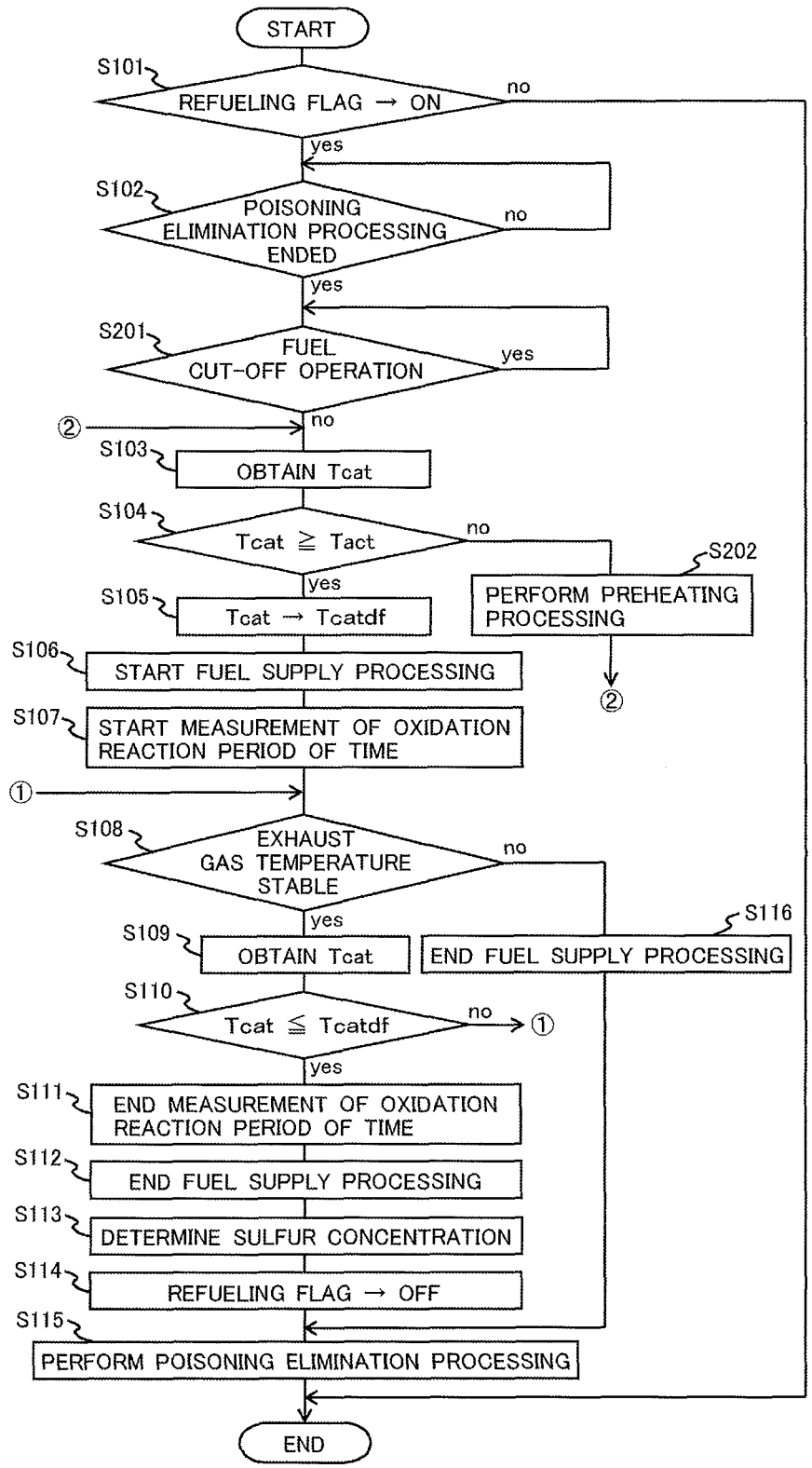
FIG. 8 is a flow chart showing a processing routine which is executed by an ECU at the time of determining the sulfur concentration of the fuel, in the third embodiment.

In the control routine of FIG. 8, in cases where an affirmative determination is made in the processing of step S102, the ECU 6 carries out the processing of step S201. In step S201, the ECU 6 determines whether the internal combustion engine 1 is in the fuel cut-off operation. In cases where an affirmative determination is made in the above-mentioned processing of step S201, the ECU 6 carries out the processing of step S201 in a repeated manner until the fuel cut-off operation of the internal combustion engine 1 ends. Then, when a negative determination is carried out in the processing of step S201 because the fuel cut-off operation of the internal combustion engine 1 ends, the ECU 6 carries out the processing of step S103 and the processing of S104 in a sequential manner.

In cases where a positive determination is made in the processing of step S104, by carrying out the processing of steps S105 through S115 in a sequential manner, the sulfur concentration of the fuel is determined according to a procedure similar to that of the above-mentioned first embodiment. On the other hand, in cases where a negative determination is made in the processing of step S104, the ECU 6 goes to the processing of step S202, without ending the execution of this processing routine.

In the processing of step S202, the ECU 6 carries out the preheat processing. Specifically, the ECU 6 raises the temperature of the oxidation catalyst by operating the electric heater 500. The routine of the ECU 6 returns to the processing of step S103 after the execution of the processing of step S202. Then, when the temperature Tcat of the oxidation catalyst rises up to the reference temperature Tact or above by heating the oxidation catalyst by means of the electric heater 500, an affirmative determination is made in the processing of step S104. In that case, the ECU 6 determines the sulfur concentration of the fuel by carrying out the processing of steps S105 through S115 in a sequential manner.

Thus, when the concentration determination processing is carried out according to the processing routine of FIG. 8, the sulfur concentration of the fuel can be determined in a quick manner, even in the case where the temperature of the oxidation catalyst becomes less than the above-mentioned reference temperature Tact, due to the fuel cut-off operation of the internal combustion engine 1 being carried out at the time when the first poisoning elimination processing after the end of the poisoning elimination processing has ended.

Here, it is considered that when a large amount of SOx is discharged from the internal combustion engine 1 in the execution period of time of the preheating processing, the sulfur poisoning of the oxidation catalyst may progress due to the SOx thus discharged, thus making it difficult to determine the sulfur concentration of the fuel in an accurate manner. Accordingly, in the execution period of time of the preheating processing, the operating state of the internal combustion engine 1 may be controlled in such a manner that the amount of SOx discharged from the internal combustion engine 1 per unit time may become small. However, when an integrated value of the amount of fuel injection in the execution period of time of the preheating processing exceeds a predetermined amount, the concentration determination processing including the fuel supply processing may not be carried out. In addition, in cases where the integrated value of the amount of fuel injection in the execution period of time of the preheating processing has exceeded the predetermined amount, the concentration determination processing including the fuel supply processing may be carried out after the poisoning elimination processing has been carried out again. The "predetermined amount" referred to herein is an amount in which it is considered to be unable to determine the sulfur concentration of the fuel in an accurate manner, when the amount of sulfur poisoning of the oxidation catalyst becomes equal to or more than the predetermined amount.

Other Embodiments

In the above-mentioned first through third embodiments, there has been described an example in which the sulfur concentration of the fuel is determined by using the oxidation reaction period of time as a parameter, but the sulfur concentration of the fuel may be determined by using as a parameter an integrated value of the supplied fuel in a period of time from the starting point in time of the fuel supply processing until the temperature of the oxidation catalyst drops to the initial temperature or below, in place of the oxidation reaction period of time. In that case, the ECU 6 should only make a determination that the sulfur concentration of the fuel is higher in the case where the integrated value of the supplied fuel is small, in comparison with the case where it is large.

In the above-mentioned first through third embodiments, there has been described an example in which the fuel supply processing is continuously carried out until the temperature of the oxidation catalyst drops to the predetermined temperature or below. However, in cases where the sulfur concentration of the fuel is low, the period of time required from the starting point in time of the fuel supply processing until the oxidation catalyst is deactivated may become long, and the amount of fuel required by the fuel supply processing may accordingly increase. In addition, in cases where sulfur components are not contained in the fuel, the oxidation catalyst may not be deactivated, as long as the fuel supply processing is continued.

Accordingly, in the case where the temperature of the oxidation catalyst does not drop to the predetermined temperature (the initial temperature) or below within a predetermined period of time from the starting point in time of the fuel supply processing, the ECU 6 may be configured to stop the fuel supply processing at the point in time when the predetermined period of time has elapsed. In that case, the sulfur concentration of the fuel may be determined by using as a parameter the temperature of the oxidation catalyst at the point in time when the predetermined period of time has elapsed. For example, a determination may be made that the lower the temperature of the oxidation catalyst at the point in time of the elapse of the predetermined period of time, the higher is the sulfur concentration of the fuel. Moreover, the ECU 6 may also be configured as follows: namely, in the case where the temperature of the oxidation catalyst at the point in time of the elapse of the predetermined period of time is lower than a predetermined determination temperature, a determination is made that sulfur is contained in the fuel, whereas in the case where the temperature of the oxidation catalyst at the point in time of the elapse of the predetermined period of time is equal to or higher than the predetermined determination temperature, a determination is made that sulfur is not contained in the fuel. According to such configurations, in the case where the sulfur concentration of the fuel is low, or in the case where sulfur is not contained in the fuel, the sulfur concentration of the fuel can be determined, without unnecessarily increasing the amount of fuel required for the fuel supply processing.

In addition, in the above-mentioned first through third embodiments, there has been described an example in which when the amount of change in the temperature of the exhaust gas exceeds the permissible amount in the course of the execution of the fuel supply processing, the execution of the concentration determination processing including the fuel supply processing is stopped, but the sulfur concentration of the fuel may be determined by correcting the oxidation reaction period of time or the predetermined temperature, without stopping the execution of the concentration determination processing including the fuel supply processing.

For example, in the case where the temperature of the exhaust gas has risen up in the course of the execution of the fuel supply processing, the sulfur concentration of the fuel may be determined by making a correction to add an amount of correction corresponding to an amount of the temperature rise to the oxidation reaction period of time, and by using the thus corrected oxidation reaction period of time as a parameter. On the other hand, in the case where the temperature of the exhaust gas has dropped in the course of the execution of the fuel supply processing, the sulfur concentration of the fuel may be determined by making a correction to subtract an amount of correction corresponding to an amount of the temperature drop from the oxidation reaction period of time, and by using the thus corrected oxidation reaction period of time as a parameter.

Moreover, in the case where the temperature of the exhaust gas has risen up in the course of the execution of the fuel supply processing, the sulfur concentration of the fuel may also be determined by making a correction to add an amount of correction corresponding to an amount of the temperature rise to the predetermined temperature, and by using as a parameter an oxidation reaction period of time until the temperature of the oxidation catalyst drops to the thus corrected predetermined temperature or below. On the other hand, in the case where the temperature of the exhaust gas has dropped in the course of the execution of the fuel supply processing, the sulfur concentration of the fuel may also be determined by making a correction to subtract an amount of correction corresponding to an amount of the temperature drop from the predetermined temperature, and by using as a parameter an oxidation reaction period of time until the temperature of the oxidation catalyst drops to the thus corrected predetermined temperature or below.

The sulfur concentration of the fuel after the refueling can be determined, without according to the method as referred to above, stopping the concentration determination processing including the fuel supply processing, even if it is a case where the temperature of the exhaust gas changes in the course of the execution of the fuel supply processing.

While the present invention has been described with reference to exemplary embodiments, it is to be understood that the invention is not limited to the disclosed exemplary embodiments.

The scope of the following claims is to be accorded the broadest interpretation so as to encompass all such modifications and equivalent structures and functions.

This application claims the benefit of Japanese Patent Application No. 2014-212811, filed on Oct. 17, 2014, which is hereby incorporated by reference herein in its entirety.

What is claimed is:

1. A sulfur concentration determination system for an internal combustion engine which is provided with an exhaust gas purification device that is disposed in an exhaust passage and includes an oxidation catalyst, and a supply device that supplies fuel to an exhaust gas flowing into the exhaust gas purification device, the sulfur concentration determination system comprising:
a controller comprising at least one processor configured to:
carry out poisoning elimination processing which is to eliminate sulfur poisoning of the oxidation catalyst by raising the temperature of the oxidation catalyst;
carry out fuel supply processing which is to supply fuel from the supply device to the exhaust gas purification device so as to make an amount of fuel supplied to the exhaust gas purification device per unit time constant, when the temperature of the oxidation catalyst is equal to or higher than a predetermined reference temperature which is equal to or higher than an activation temperature, after the end of the poisoning elimination processing;
measure a physical quantity which is correlated with a period of time required from a starting point in time of the fuel supply processing until the temperature of the oxidation catalyst drops to a predetermined temperature or below which is equal to or higher than a temperature at the starting point in time of the fuel supply processing, under the condition that the fuel supply processing is continuously carried out, the physical quantity becoming larger as the period of time becomes longer; and
make a determination that the concentration of sulfur components contained in the fuel is higher when the physical quantity is small, in comparison with when it is large.

2. The sulfur concentration determination system for an internal combustion engine as set forth in claim 1, wherein
the exhaust gas purification device is further provided with a heating device that heats the oxidation catalyst, without accompanying supply of fuel to the exhaust gas purification apparatus; and
the controller carries out the poisoning elimination processing by heating the oxidation catalyst by means of the heating device.

3. The sulfur concentration determination system for an internal combustion engine as set forth in claim 2, further comprising:
that the controller carries out preheating processing which is to raise the temperature of the oxidation catalyst to the reference temperature or above by means of the heating device, in cases where the temperature of the oxidation catalyst has dropped to less than the reference temperature, after the end of the poisoning elimination processing and before the start of the fuel supply processing;
wherein the controller starts the fuel supply processing, when the temperature of the oxidation catalyst has been caused to rise to the reference temperature or above by carrying out the preheating processing.

4. The sulfur concentration determination system for an internal combustion engine as set forth in claim 3, further comprising:
that the controller stops the fuel supply processing at the point in time when a predetermined period of time has elapsed, in the case where the temperature of the oxidation catalyst does not drop to the predetermined temperature or below within the predetermined period of time from the starting point in time of the fuel supply processing;
wherein the controller determines that when the temperature of the oxidation catalyst at the point in time of the elapse of the predetermined period of time is low, the concentration of sulfur components contained in the fuel is higher, in comparison with when it is high.

5. The sulfur concentration determination system for an internal combustion engine as set forth in claim 2, further comprising:
that the controller stops the fuel supply processing at the point in time when a predetermined period of time has elapsed, in the case where the temperature of the oxidation catalyst does not drop to the predetermined temperature or below within the predetermined period of time from the starting point in time of the fuel supply processing;
wherein the controller determines that when the temperature of the oxidation catalyst at the point in time of the elapse of the predetermined period of time is low, the concentration of sulfur components contained in the fuel is higher, in comparison with when it is high.

6. The sulfur concentration determination system for an internal combustion engine as set forth in claim 1, wherein
the exhaust gas purification device is further provided with a heating device that heats the oxidation catalyst, without accompanying supply of fuel to the exhaust gas purification apparatus;
the controller carries out the poisoning elimination processing according to either one of a first temperature raising mode in which the temperature of the oxidation catalyst is raised by supplying fuel from the supply device to the exhaust gas purification device, and a second temperature raising mode in which the temperature of the oxidation catalyst is raised by heating the oxidation catalyst by means of the heating device, wherein the poisoning elimination processing is carried out according to the second temperature raising mode before the execution of the fuel supply processing.

7. The sulfur concentration determination system for an internal combustion engine as set forth in claim 6, further comprising:
that the controller carries out preheating processing which is to raise the temperature of the oxidation catalyst to the reference temperature or above by means of the heating device, in cases where the temperature of the oxidation catalyst has dropped to less than the reference temperature, after the end of the poisoning elimination processing and before the start of the fuel supply processing;

wherein the controller starts the fuel supply processing, when the temperature of the oxidation catalyst has been caused to rise to the reference temperature or above by carrying out the preheating processing.

8. The sulfur concentration determination system for an internal combustion engine as set forth in claim 7, further comprising:

that the controller stops the fuel supply processing at the point in time when a predetermined period of time has elapsed, in the case where the temperature of the oxidation catalyst does not drop to the predetermined temperature or below within the predetermined period of time from the starting point in time of the fuel supply processing;

wherein the controller determines that when the temperature of the oxidation catalyst at the point in time of the elapse of the predetermined period of time is low, the concentration of sulfur components contained in the fuel is higher, in comparison with when it is high.

9. The sulfur concentration determination system for an internal combustion engine as set forth in claim 6, further comprising:

that the controller stops the fuel supply processing at the point in time when a predetermined period of time has elapsed, in the case where the temperature of the oxidation catalyst does not drop to the predetermined temperature or below within the predetermined period of time from the starting point in time of the fuel supply processing;

wherein the controller determines that when the temperature of the oxidation catalyst at the point in time of the elapse of the predetermined period of time is low, the concentration of sulfur components contained in the fuel is higher, in comparison with when it is high.

10. The sulfur concentration determination system for an internal combustion engine as set forth in claim 1, wherein the controller ends the fuel supply processing, when the temperature of the oxidation catalyst drops to the predetermined temperature or below, and carries out the poisoning elimination processing again, when the fuel supply processing has ended.

11. The sulfur concentration determination system for an internal combustion engine as set forth in claim 10, further comprising:

that the controller stops the fuel supply processing at the point in time when a predetermined period of time has elapsed, in the case where the temperature of the oxidation catalyst does not drop to the predetermined temperature or below within the predetermined period of time from the starting point in time of the fuel supply processing;

wherein the controller determines that when the temperature of the oxidation catalyst at the point in time of the elapse of the predetermined period of time is low, the concentration of sulfur components contained in the fuel is higher, in comparison with when it is high.

12. The sulfur concentration determination system for an internal combustion engine as set forth in claim 1, further comprising:

that the controller stops the fuel supply processing at the point in time when a predetermined period of time has elapsed, in the case where the temperature of the oxidation catalyst does not drop to the predetermined temperature or below within the predetermined period of time from the starting point in time of the fuel supply processing;

wherein the controller determines that when the temperature of the oxidation catalyst at the point in time of the elapse of the predetermined period of time is low, the concentration of sulfur components contained in the fuel is higher, in comparison with when it is high.

* * * * *